United States Patent

Bruzesse

(12)

(10) Patent No.: US 6,738,460 B1
(45) Date of Patent: May 18, 2004

(54) APPARATUS FOR INDICATING CALLER AVAILABILITY

(76) Inventor: Ralph A. Bruzesse, 1120 Main St., Hingham, MA (US) 02043

( * ) Notice: Subject to any disclaimer, the term of this patent is extended or adjusted under 35 U.S.C. 154(b) by 0 days.

(21) Appl. No.: 10/191,697

(22) Filed: Jul. 10, 2002

(51) Int. Cl.[7] ............................................... H04M 1/56
(52) U.S. Cl. ............................ 379/142.01; 379/142.1; 379/142.11; 379/142.17; 379/419; 379/428.03; 379/916
(58) Field of Search ..................... 379/142.01, 142.04, 379/142.07, 142.1, 142.11, 142.13, 142.15, 142.17, 167.01, 156, 88.21, 93.05, 93.23, 93.19, 916, 419, 428.03; 455/415, 421

(56) References Cited

U.S. PATENT DOCUMENTS

| 3,784,721 A | 1/1974 | Kilby |
| 4,266,098 A | 5/1981 | Novak |
| 4,405,839 A | 9/1983 | Groff |
| 4,600,809 A | 7/1986 | Tatsumi et al. |
| 4,616,110 A | 10/1986 | Hashimoto |
| 4,893,329 A | 1/1990 | O'Brien |
| 5,060,255 A | 10/1991 | Brown |
| 5,467,388 A | 11/1995 | Redd, Jr. et al. |
| 5,757,899 A | 5/1998 | Boulware et al. |
| 5,815,554 A | 9/1998 | Burgess et al. |
| 5,841,855 A | * 11/1998 | Davidson et al. ............ 379/396 |
| 6,031,900 A | * 2/2000 | Dziulko et al. ......... 379/142.01 |
| 6,076,093 A | * 6/2000 | Pickering .................. 707/104.1 |
| 6,317,491 B1 | * 11/2001 | Chang et al. ........... 379/142.01 |
| 6,341,160 B2 | 1/2002 | Tverskoy et al. |
| 6,353,664 B1 | 3/2002 | Cannon et al. |
| 6,366,962 B1 | * 4/2002 | Teibel ......................... 709/245 |
| 6,389,124 B1 | * 5/2002 | Schnarel et al. ........ 379/142.01 |
| 6,396,849 B1 | * 5/2002 | Sarkissian et al. ........... 370/490 |
| 6,442,261 B1 | * 8/2002 | Pearsall .................. 379/142.01 |
| 6,516,202 B1 | * 2/2003 | Hawkins et al. .......... 455/556.2 |
| 6,584,188 B2 | * 6/2003 | Kim ....................... 379/211.02 |

* cited by examiner

*Primary Examiner*—Curtis Kuntz
*Assistant Examiner*—Quoc Tran
(74) *Attorney, Agent, or Firm*—John P. McGonagle

(57) ABSTRACT

A caller identification availability apparatus located adjacent a caller's telephone. The caller identification availability apparatus indicates who, among a select group of people, are available to receive telephone calls. Each caller within a select group has a similar apparatus adjacent their telephone. Caller's within the group are able to indicate availability or nonavailability to each caller within the group by means of their individual apparatus.

7 Claims, 3 Drawing Sheets

APPARATUS FOR INDICATING CALLER AVAILABILITY

BACKGROUND OF THE INVENTION

This invention relates generally to telecommunications devices and more particularly to a device which indicates who within a select group are available to receive telephone calls.

A need has been identified in the prior art for a service which will provide people a control over their telephone service to permit work or relaxation without the normal interruptions caused by a ringing telephone. In recent years do-not-disturb services have become available. The basic feature of these services, is that a caller will receive a message from the call recipient's telephone that the recipient is not available for calls or is not available for calls until a certain time.

While effective to some extent, the prior art telephone screening services do not discern among groups of people, e.g., telemarketers, general public, family groups, friends, business associates, and the like. While the call recipient might wish to block out all telemarketing calls and general public calls after a certain time, the call recipient may wish to receive calls from a family group anytime, and from friends during time periods different than those from the family group and/or telemarketers and/or general public calls.

SUMMARY OF THE INVENTION

The present invention addresses the above problems by providing an apparatus which indicates to other callers within a select group a call recipient availability to receive telephone calls. The instant invention provides a caller identification availability apparatus located adjacent a caller's telephone and indicates who, among a select group of people, are available to receive telephone calls. Each caller within a select group has a caller identification availability apparatus adjacent their telephone. Caller's within the group are able to indicate availability or nonavailability to each caller within the group by means of their individual apparatus.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF INVENTION

Figure 1:
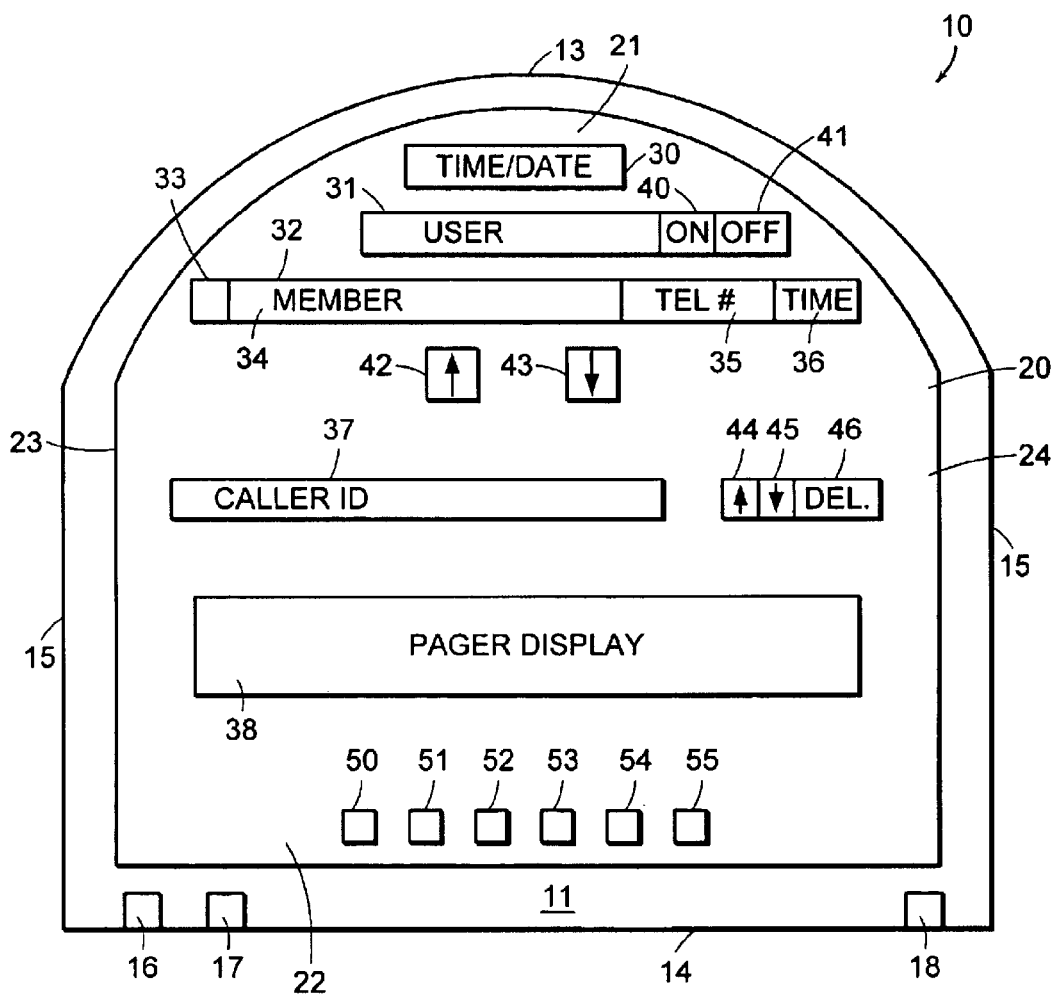
FIG. 1 is a front view of a called identification availability apparatus.
Figure 2:
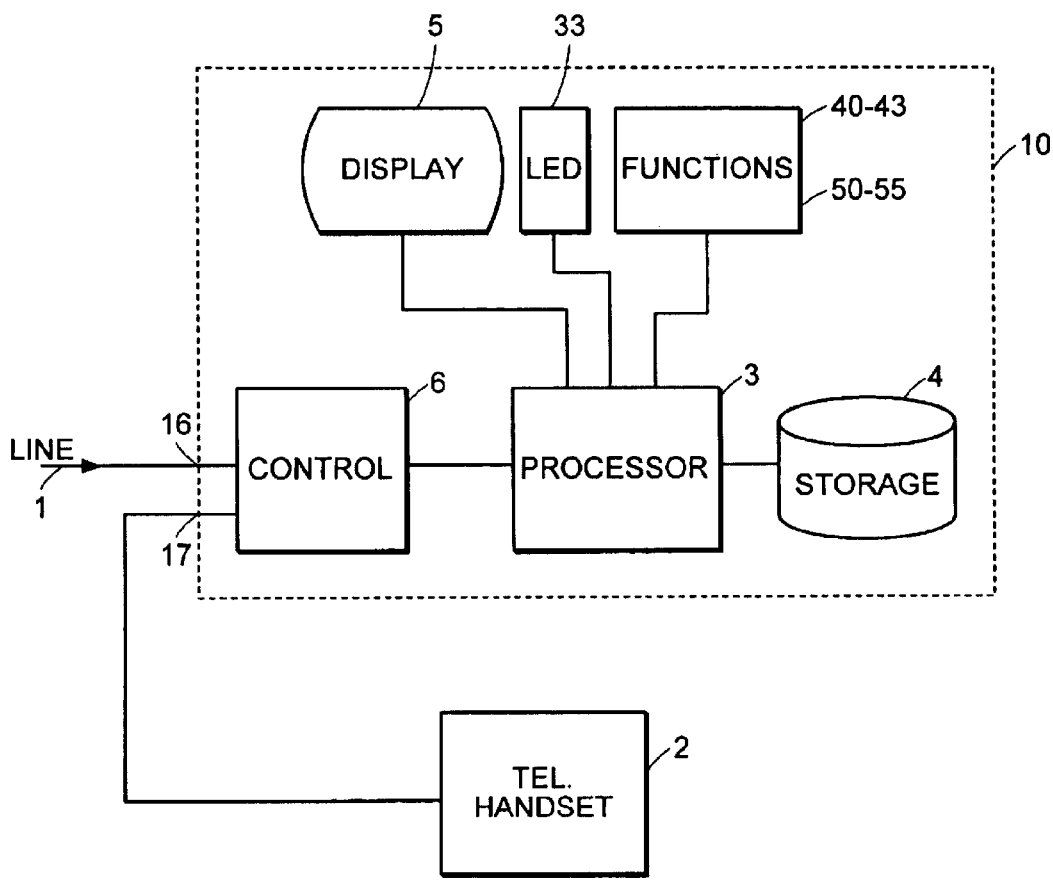
FIG. 2 is a schematic diagram of the main electronic components of the caller identification availability apparatus.
Figure 3:
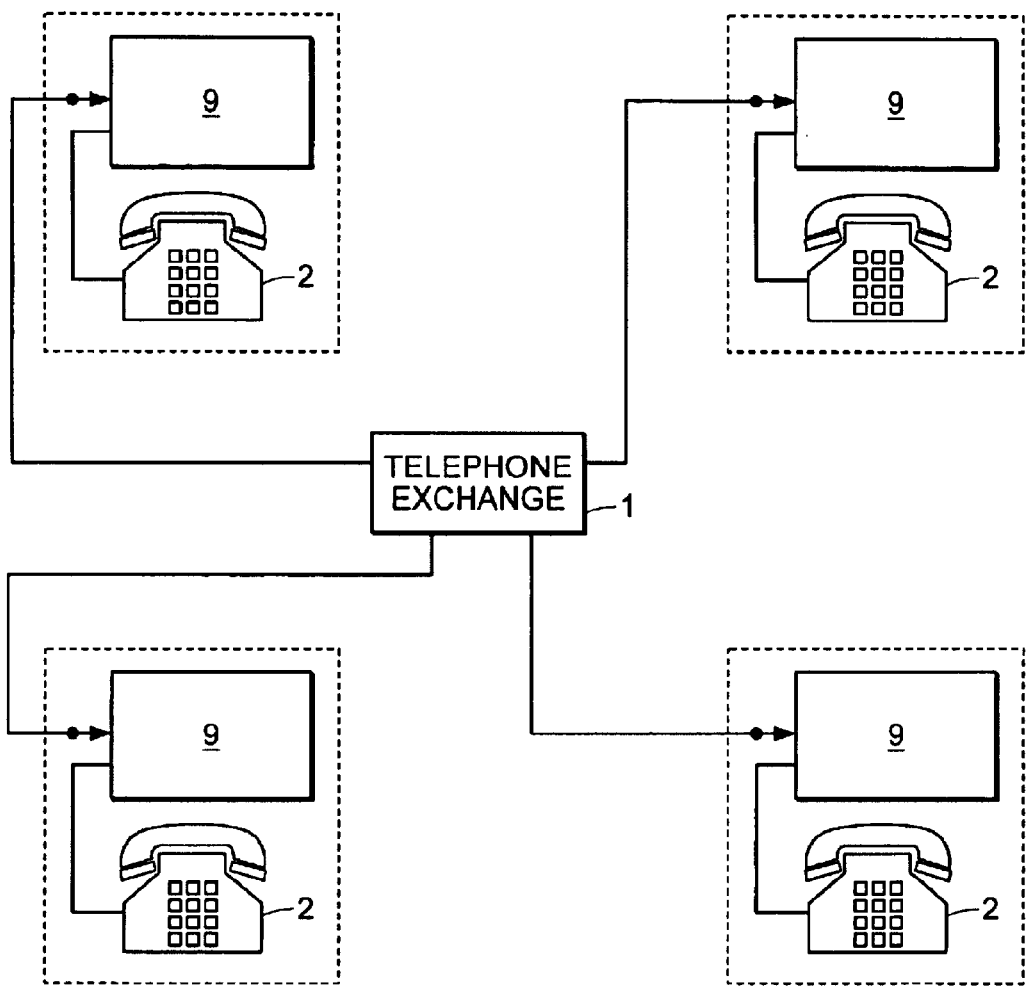
FIG. 3 is a schematic diagram of a network in which the instant invention is used.

Referring to the drawings in detail wherein like elements are indicated by like numerals, there is shown a caller identification availability apparatus 9. The apparatus 9 is comprised of a housing 10 with a display 20. The housing 10 has a front 11, rear (not shown), top 13, bottom 14, and two opposite sides 15. The housing 10 has two standard telephone jacks 16, 17, a first jack 16 adapted to receive a telephone line connected to an-external telephone outlet 1 connected to a telephone network, and a second jack 17 adapted to receive a telephone line connected to a telephone 2. The housing 10 has a power input jack 18 adapted to receive electrical power from a power adapter or from a standard power outlet. The housing 10 may optionally be powered either solely or in an interrupt mode by batteries enclosed within the housing 10.

The housing front 11 contains a display 20 and a plurality of control function buttons for indicating and controlling the apparatus functions. The display 20 is oriented with a top portion 21, bottom portion 22, left side portion 23 and right side portion 24. A time/date subdisplay 30 is positioned centrally in the display top portion 21 near the housing top 13. Just below the time/date subdisplay 30 is a personal subdisplay 31 indicating the user's name. Two lighted switches, an "on" button 40, and an "off" button 41, are positioned beside the personal subdisplay 31. When the user is available for telephone calls, the "on" button 40 is activated. If the user is not available to receive telephone calls, the "off" button 41 is activated. The activated button 40, 41 is lighted.

Still in the display top portion 21, but beneath the personal subdisplay 31, is a select group member strip subdisplay 32 having from left to right, an availability light 33, member name 34, member's telephone number 35, and member's time of day 36. Beneath the strip subdisplay 32 are two side-by-side scroll buttons, one "up" 42 and one "down" 43. The availability light 33 indicates whether or not the particular member 34 indicated on the subdisplay 32 is available to receive a telephone call. The availability light 33 is a dual light, i.e., red and green. The availability light 33 lights green when the indicated member is available to receive a telephone call. The availability light 33 lights red when the indicated member is not available to receive a telephone call. The scroll buttons 42, 43 allow a user to access various members of the select group.

In the approximate middle of the display 20, just beneath the scroll buttons 42, 43, is a strip subdisplay 37 showing the "caller id" of anyone calling the user. To the right of the caller id subdisplay 37 are three side-by-side buttons, a first button 44 and a second button 45 for scrolling upward and downward through the various calls received, and a third button 46 for erasing caller id records received.

In the-lower portion 22 of the display 20, beneath the caller id strip subdisplay 37, a pager subdisplay 38 provides means for displaying a brief message from a member. If a message is displayed, the member name 34 would generally also be displayed and could be programmed to blink if a corresponding message is shown in the pager subdisplay 38. A number of messages could be queued, with each member message being shown as the previous message is deleted. The delete button 55 along the display bottom portion 22 could be used-to delete messages which have been read.

Along the bottom display portion 22 are a number of side-by-side buttons controlling the various functions of the apparatus 9. A first button 50 is labeled "program" and provides an edit function for adding, deleting or changing data in the apparatus 9. A second button 51 is labeled "set" and provides and acts as an "enter" function. A third button 52 is a select function button permitting a user to select the member name 34 subdisplay. A fourth button 53 is a select function button permitting a user to select the telephone number 35 subdisplay. A fifth button 54 is a select function button permitting a user to select the member time of day 36 subdisplay. A sixth button 55 provides a delete function allowing the user to delete the information shown on a selected subdisplay item. The handset of the telephone 2 acts as a keyboard for entering information for a selected subdisplay item.

After the information is entered for each member in a select group, the apparatus 9 enters into an automatic mode. Any time a user changes one of the on/off buttons 40, 41 the apparatus 9 automatically contacts each select group member apparatus listed within the originating user's apparatus and updates a data field controlling that member's availability light 33. To prevent telephone handset ringing during the update process, each apparatus transmits a code along with the normal telephone contact. Each apparatus first checks for this code on any incoming calls. If an incoming call has this code, the call is directed into the apparatus for data field updating and the telephone handset ringer is by-passed. If an incoming call does not have this code, then the incoming call is passed to the telephone handset in a normal fashion.

Electronically, the housing 10 contains a microprocessor 3 with a hard drive storage area 4. The microprocessor 3 drives the display 5 comprised of the subdisplays 30, 31, 34, 35, 36 and 37. The availability light 33 is typically comprised of a light emitting diode (LED) driven by the microprocessor. The function buttons comprised of 40–43 and 50–55, act as program interrupts to the microprocessor 3. The apparatus 9 has a controller 6 for determining update codes and for using the telephone handset 2 as an input mechanism during program functions.

It is understood that the above-described embodiment is merely illustrative of the application. Other embodiments may be readily devised by those skilled in the art which will embody the principles of the invention and fall within the spirit and scope thereof.

I claim:

1. A caller identification availability apparatus for use by a caller within a select group, comprising:
   a housing having a front, rear, top, bottom, and two opposite sides, said housing having two standard telephone jacks, a first jack adapted to receive a telephone line connected to an external telephone outlet connected to a telephone network, and a second lack adapted to receive a telephone line connected to a telephone, said housing having a power input jack adapted to receive electrical power from a power source;
   a display on said housing front, said display being comprised of a plurality of subdisplays, said display having a upper portion, middle portion, lower portion, left side portion and right side portion;
   wherein said plurality of subdisplays are comprised of:
      a time and date subdisplay adapted to display a current time and date, said time and date display being positioned centrally in the display upper portion near the housing top;
      a personal subdisplay adapted to indicate a user's name, said personal subdisplay being positioned below the time and date subdisplay;
      a select group caller strip subdisplay adapted to show a select group caller name, a select group caller's telephone number, and a select group caller's time of day, said select group caller strip subdisplay being positioned beneath the personal subdisplay;
      a strip subdisplay adapted to show a caller identification of anyone calling the user, said caller identification strip subdisplay being positioned in the display middle portion beneath said select group caller strip subdisplay; and
      a pager subdisplay adapted to display a brief message from a select group caller, said pager subdisplay being positioned in the display lower portion;
   a plurality of lights on said display, said lights adapted to indicate a status for a select subdisplay; and
   a plurality of control function buttons on said display, said control function buttons adapted for indicating and controlling a plurality of apparatus functions.

2. A caller identification availability apparatus as recited in claim 1, wherein said housing is further comprised of:
   a microprocessor with a hard drive storage area, said microprocessor being adapted to drive the said subdisplays;
   a controller interconnected with said microprocessor, said controller adapted for determining a plurality of update codes and for using an interconnected telephone handset as an input mechanism for program functions;
   wherein said control function buttons are adapted to act as program interrupts to the microprocessor.

3. A caller identification availability apparatus as recited in claim 2, wherein said plurality of control function buttons are comprised of:
   two side-by-side scroll buttons, one up and one down, said scroll buttons being positioned adjacent the select group caller strip subdisplay, said scroll buttons being adapted to allow a user to access various select group callers;
   three caller identification buttons positioned adjacent the caller identification strip subdisplay, a first button and a second button adapted for scrolling upward and downward through a plurality of calls received through said apparatus, and a third button for erasing any caller id records received;
   a plurality of apparatus function buttons, positioned in the display lower portion, including a first button adapted to provide an edit function for adding, deleting or changing data in the apparatus, a second button adapted to provide an enter function, a third button adapted to permit a user to select said select group caller name, a fourth button adapted to permit a user to select said select group caller's telephone number, a fifth button adapted to select the select group caller's time of day, and a sixth button adapted to provide a delete function allowing the user to delete information shown on a selected subdisplay item;
   wherein said interconnected handset is adapted to act as a keyboard for entering information for a selected subdisplay item.

4. A caller identification availability apparatus as recited in claim 3, wherein said plurality of lights are comprised of:
   two lighted switches, one adapted to indicate on and the other off, said lighted switches being positioned beside the personal subdisplay, said on switch adapted to being activated when a user indicated on said personal subdisplay is available for telephone calls, said off switch adapted to being activated when a user indicated on said personal subdisplay is not available for telephone calls; and
   an availability light adjacent the select group caller strip subdisplay, said availability light being adapted to indicate whether or not a select group caller indicated on the subdisplay select group caller strip subdisplay is available to receive a telephone call.

5. A caller identification availability apparatus as recited in claim 4, wherein:

the availability light is comprised of a light emitting diode driven by said microprocessor.

6. A caller identification availability apparatus as recited in claim 5, wherein:

said availability light is a dual light, and adapted to light one color an indicated select group caller is available to receive a telephone call, and another color when said indicated select group caller not available to receive a telephone call.

7. A caller identification availability apparatus as recited in claim 6, wherein:

said apparatus is adapted to contact through said telephone network each caller within said select group and update an availability light on each caller's apparatus; and said apparatus is adapted to transmit a code along with a normal telephone contact to prevent telephone handset ringing during an update process.

* * * * *